(12) United States Patent
Verbist

(10) Patent No.: US 7,450,715 B2
(45) Date of Patent: Nov. 11, 2008

(54) TRANSCEIVER FOR BIDIRECTIONAL FREQUENCY DIVISION MULTIPLEXED TRANSMISSION

(75) Inventor: Rudi Verbist, Mechelen (BE)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 11/857,255

(22) Filed: Sep. 18, 2007

(65) Prior Publication Data

US 2008/0008107 A1    Jan. 10, 2008

Related U.S. Application Data

(63) Continuation of application No. 10/694,953, filed on Oct. 29, 2003, now Pat. No. 7,330,703.

(60) Provisional application No. 60/482,494, filed on Jun. 26, 2003.

(51) Int. Cl.
*H04M 1/76* (2006.01)
*H04M 9/00* (2006.01)

(52) U.S. Cl. .............. 379/414; 379/401; 379/402; 379/405; 379/399.01; 379/391; 375/258; 375/259; 375/268; 375/269; 370/314; 370/319; 370/321; 370/322; 370/330; 370/343; 370/344; 370/347

(58) Field of Classification Search .............. None
See application file for complete search history.

(56) References Cited

U.S. PATENT DOCUMENTS 6,898,236 B1 *   5/2005   Sun .......................... 375/222

7,020,277 B1 *   3/2006   Lee et al. .................. 379/405

FOREIGN PATENT DOCUMENTS

EP    901 221 A1    3/1999
EP    1 220 444     7/2002

* cited by examiner

*Primary Examiner*—Chi H Pham
*Assistant Examiner*—Raj K Jain
(74) *Attorney, Agent, or Firm*—Sterne, Kessler, Goldstein & Fox PLLC

(57) ABSTRACT

The present invention relates to a transceiver for bidirectional frequency division multiplexed transmission, a communication system including one or more transceivers. Optionally, the communication system is a communication system for a digital subscriber line. The transceiver comprises transmission means with a voltage source output or a current source output for transmitting data in a transmission frequency range, receiving means for receiving data in a receiving frequency range, and a coupling impedance for connecting the transmission means and the receiving means to a transmission medium. The magnitude of the coupling impedance in the transmission frequency range is smaller than the magnitude of the coupling impedance in the receiving frequency range if the transmission means has a voltage source output and is higher than the magnitude of the coupling impedance in the receiving frequency range if the transmission means has a current source output. Due to the reduced magnitude or increased magnitude respectively in the transmitting frequency range, the transmit signal power requirement is reduced. In one variant of the invention, the magnitude of the coupling impedance is matched to the magnitude of the impedance of the transmission medium in order to increase the power of the received signals.

16 Claims, 2 Drawing Sheets

TRANSCEIVER FOR BIDIRECTIONAL FREQUENCY DIVISION MULTIPLEXED TRANSMISSION

CROSS-REFERENCE TO RELATED APPLICATIONS

This application is a continuation of U.S. Non-Provisional application Ser. No. 10/694,953, filed Oct. 29, 2003 now U.S. Pat. No. 7,330,703, which claims benefit to U.S. Provisional Application No. 60/482,494, filed on Jun. 26, 2003, all of which are incorporated herein by reference in its entirety.

BACKGROUND OF THE INVENTION

The present invention generally relates to communication systems for full duplex frequency division multiplexed transmission. The present invention relates more particularly to a transceiver, a communication system using a transceiver, and methods related thereto and used therewith.

Traditionally the coupling impedances are matched to the impedance of a transmission medium in order to receive at a receiving means the maximum of the transmitted power. For transmitting, however, these impedances are undesired because they imply that more signal power has to be delivered by the transmission means.

One known solution consists of partially reducing the values of the coupling impedances. This reduces the transmitting signal power requirement but also causes an undesirable additional attenuation of the receiving signals. Another solution is generally described in EP 901221 A1 and in EP 1220444 A1. This solution consists of synthesizing the coupling impedances by using operational amplifiers with positive feedback. This approach also has significant drawbacks. If, for instance, the impedance of the transmission medium increases the required signal output of the operational amplifiers also increases which can cause undesirable signal clipping or may require increasing the supply voltage of the operational amplifiers. Increased supply voltage, however, causes additional undesirable power dissipation. Another disadvantage of this method is that it uses positive feedback, which makes it inherently more prone to oscillations.

The present invention solves the aforementioned exemplary problems, and/or other problems in the art, and provides a transceiver with reduced signal power requirements and high signal power of the receiving signal.

SUMMARY OF THE INVENTION

The present invention relates to a transceiver including transmission means for transmitting data in a transmission frequency range; receiving means for receiving data in a receiving frequency range; and a coupling impedance for connecting the transmission means and the receiving means to a transmission medium. The magnitude of the coupling impedance in the transmission frequency range is smaller than the magnitude of the coupling impedance in the receiving frequency range. If the transmission means has a voltage source output the magnitude of the coupling impedance in the transmission frequency range is smaller than the magnitude of the coupling impedance in the receiving frequency range. If the transmission means has a current source output the magnitude of the coupling impedance in the transmission frequency range is higher than the magnitude of the coupling impedance in the receiving frequency range.

The coupling impedance for example can be a single passive electric element, but also can be a combination of several coupled passive electric elements. So by way of example the impedance can be split in an impedance section specially adapted for the receiving direction and an impedance section specially adapted for the transmission direction both impedance sections being coupled together and forming together the coupling impedance.

In one variant, the impedance value of the coupling impedance only in the receiving frequency range is substantially identical to the complex conjugate of the transmission medium impedance in the receiving frequency range.

In yet another variant, the transmission frequency range includes higher frequencies than the receiving frequency range and the coupling impedance has a high pass filter characteristic which means herein that the impedance approaches zero in transmission frequency range and approaches the complex conjugate transmission medium impedance in the receiving frequency range. Optionally, the coupling impedance is a parallel combination of a capacitor and a resistor.

In yet a further aspect, the transmission frequency range includes lower frequencies than the receiving frequency range, and the coupling impedance has a low pass filter characteristic which means herein that the impedance approaches zero in transmission frequency range and approaches the complex conjugate transmission medium impedance in the receiving frequency range. Optionally, the coupling impedance is a parallel combination of an inductor and a resistor. In yet other variants, the transmission frequency range and the receiving frequency range are separated by a threshold frequency (fx).

In order to obtain the desired low pass or high pass filter characteristic respectively optionally other than the above mentioned combinations of capacitors, inductors and resistors can be used.

In yet a further aspect, the transceiver is part of a communication system for a digital subscriber line. Optionally, the communication system includes two transceivers. The transmitting frequency range of a first transceiver corresponding the receiving frequency range of a second transceiver is above a threshold frequency (fx) and the receiving frequency range of the first transceiver corresponding the transmitting frequency range of the second transceiver is below the threshold frequency (fx). In a first variant a first coupling impedance of the first transceiver has a high pass filter characteristic. In a second variant a second coupling impedance of the second transceiver has a low pass filter characteristic. Furthermore in a third variant the first coupling impedance of the first transceiver has a high pass filter characteristic and the second coupling impedance of the second transceiver has a low pass filter characteristic.

These and other advantages, aspects and novel features of the present invention, as well as details of illustrated examples, are more fully understood from the following description and drawings.

DETAILED DESCRIPTION OF THE INVENTION

Figure 1:
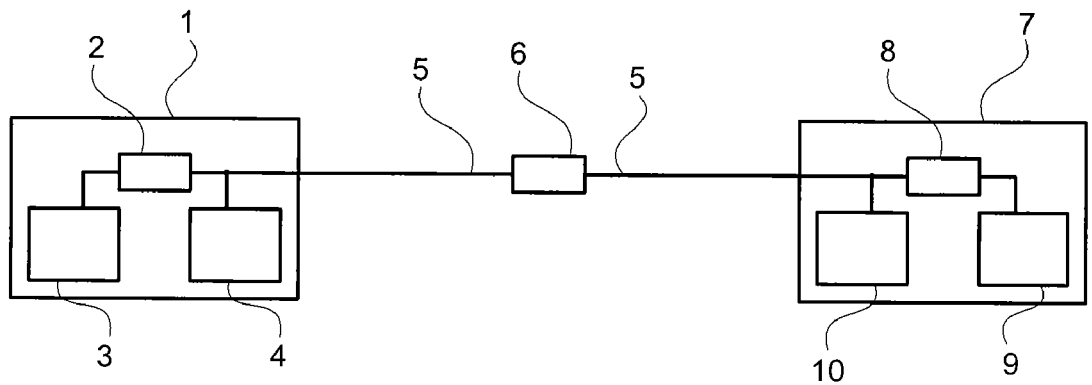
FIG. 1 illustrates a schematic block diagram of a bidirectional full duplex frequency division multiplexed communication system with two transceivers in accordance with one embodiment of the present invention.

FIG. 1 illustrates a schematic block diagram of a bidirectional full duplex frequency division multiplexed communication system with a first transceiver 1 and a second transceiver 7, both transceivers 1, 7 being connected together by means of a transmission line 5. The impedance of the transmission line 5 is represented by a transmission line impedance 6.

In a full duplex frequency division multiplexed transmission system, data are transmitted in both directions over a transmission medium. For the simultaneous transmissions of signals in different directions, different frequencies or frequency ranges are used to avoid interference between the two signals. A transceiver for such a communication system is adapted to transmit in a transmitting frequency range and to receive in a different receiving frequency range. The frequency ranges can comprise one single frequency or several different frequencies. Generally the frequency ranges for transmitting or receiving correspond to the section of the spectrum comprising the signal power of the transmitted and received signal respectively.

If a communication is to be established between two transceivers, the transmitting frequency range of one transceiver corresponds to the receiving frequency range of the other transceiver. The present invention can also be employed in communication systems with two or more transceivers.

With a transceiver with the aforementioned features full duplex frequency division multiplexed transmission is possible without the disadvantages described in relation with the background of the present invention. The basic idea is to set the coupling impedance of the transceiver so that it is substantially zero or at least very small for the transmission signal band or transmission frequency range respectively and at the same time has an increased impedance magnitude for the receiving signal in the receiving frequency range in order to increase the receiving signal power.

In one variant, the coupling impedance is substantially identical to the complex conjugate of the transmission medium impedance in the receiving frequency range. So the coupling impedance can be matched to the transmission characteristic of the transmission medium in order to receive the maximum receiving signal power.

The transmitting frequency range of a transceiver can be separated from the receiving frequency range of this transceiver by a threshold frequency.

In another variant, the coupling impedance has a high pass filter characteristic which, by way of example in it's simplest form, can be achieved by using a parallel combination of a capacitor and further electric components like a resistor. Such a coupling impedance is used for a transceiver whose transmitting frequency range is above the receiving frequency range.

In yet another variant, the coupling impedance has a low pass filter characteristic. Such characteristic is achieved by a parallel combination of an inductor and further electric components like a resistor and is, optionally, used where the transmitting frequency range is below the receiving frequency range.

In the aforementioned examples for the coupling impedances with low pass characteristic and high pass characteristic respectively are provided. It is appreciated that several other possibilities to achieve the desired frequency response can also be used.

By way of a further example it can be used a parallel combination of a resistor R and a serial combination of capacitor C and an inductor L. In this case the impedance $Z=R*(1+p^2*L*C)/(1+p^2*L*C+p*R*C)$, can be achieved, p being $j*2*pi*f$. This can useful if for example the receiving band uses both a lower and a higher frequency band, the transmitting frequency range being in the middle.

A further example consists of a parallel combination of a resistor R, an inductor L and a capacitor C can be used. In this case the impedance $Z=1/(1/R+p*C+1/p/L)$, can be achieved, p being $j*2*pi*f$. This can be useful if for example the transmitting band uses both a lower and a higher frequency band, the receiving frequency range being in the middle.

Furthermore the resistance can be replaced by a more complex impedance, matching the complex conjugate of the characteristic impedance. For example a parallel combination of a resistor and a serial combination of a resistor and a capacitor may be a better approximation for matching a twisted pair cable.

Furthermore, it has to be noted that the above mentioned applies to voltage sources for the transmitters. If one uses a current source transmitter, then the impedance should go to infinity rather than 0 in the transmission band. In this case the impedance which matches the transmission medium should be combined in a serial combination with a capacitor, if the transmission band is lower than the receiving band, and with an inductor, if the transmission band is higher than the receiving band. Using a current source transmitter also the transceiver according to the present invention has to be modified such that the magnitude of the coupling impedance in the transmission frequency range is higher than the magnitude of the coupling impedance in the receiving frequency range. The frequency response of the coupling impedance has to be modified accordingly.

In FIG. 1 a full duplex transmission system is outlined which comprises a first transceiver 1 and a second transceiver 7 connected by means of a transmission medium 5 which has an impedance 6. The transmission medium 5 is, by way of example, a twisted pair line like a digital subscriber line. Both transceivers 1, 7 comprise transmitting means 3 and 9 respectively connected to the transmission medium 5 via coupling impedances 2 and 8 respectively. Furthermore, the transceivers 1, 7 comprise receiving means 4, 10 respectively connected directly to the transmission medium 5.

The transmitting means 3 of the first transceiver 1 injects a first transmitting signal with source impedance 2. The first transmitting signal is received by the receiving means 10 of the second transceiver 7. Transmission of a signal in the other direction is carried out in a corresponding manner from transmitting means 9 of the second transceiver 7 to the receiving means 4 of the first transceiver 1.

The first transceiver 1 comprises first receiving means 4 and the second transceiver 7 comprises a second receiving means 10. Both receiving means are connected to the transmission line 5 and are adapted for receiving data transmitted over the transmission line 5. Furthermore, the first transceiver 1 comprises first transmitting means 3 which is connected via a first coupling impedance 2 to the transmission line 5.

The second transceiver 7 comprises second transmitting means 9 which is connected via a second coupling impedance 8 to the transmission line 5.

Between the two transceivers 1, 7 bidirectional communication is established by using different frequency ranges for the transmission of signals from the first to the second transceiver, and vice versa.

Figure 2:
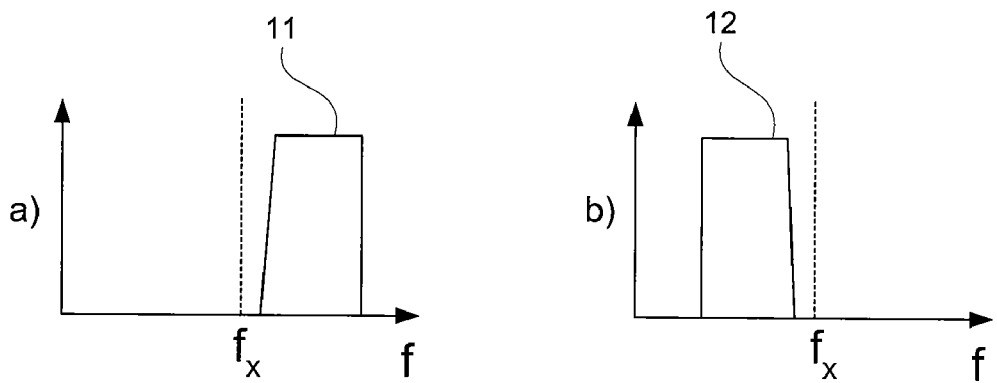
FIGS. 2a and b illustrate the frequency ranges for the signals transmitted by both transceivers of FIG. 1.

FIG. 2a illustrates the transmission frequency range 11 of the signals transmitted by the first transceiver 1. This transmission frequency range 11 lies above a threshold frequency $f_x$ in one variant of the invention. The signals transmitted by the first transceiver 1 are received by the second transceiver 7, so that the transmission frequency range 11 of the first transceiver 1 corresponds to the receiving frequency range of the second transceiver 7.

FIG. 2b illustrates the transmission frequency range 12 of the signals transmitted by the second transceiver 7 which lies below the threshold frequency $f_x$ in yet another variant of the invention. Like in the case of the transmission frequency range 11 of the first transceiver 1 the transmission frequency range 12 of the second transceiver 7 is the receiving frequency range of the first transceiver 1.

In order to maximize the signal power of the receiving signals both coupling impedances 2, 8 are matched to the transmission line impedance 6 in the respective receiving frequency range. That means that the first coupling impedance 2 in the receiving frequency range 12 of the first transceiver 1 is equal to or optionally substantially equal to the complex conjugate of the transmission line impedance 6 for these frequencies. Also, the second coupling impedance 8 in the receiving frequency range 11 of the second transceiver 7 is substantially identical to the complex conjugate of the transmission line impedance 6.

The coupling impedances 2, 8 are adapted to have reduced magnitudes for the respective transmission frequency ranges. That means, that the magnitude of the first coupling impedance 2 for the transmitting frequency range 11 of the first transceiver 1 is substantially reduced and smaller than the magnitude of the first coupling impedance 2 for the receiving frequency range 12 of the first transceiver 1. Vice versa, the magnitude of the second coupling impedance 8 for the transmitting frequency range 12 of the second transceiver 7 is substantially reduced and smaller than the magnitude of the second coupling impedance 8 for the receiving frequency range 11 of the second transceiver 7.

Figure 3:
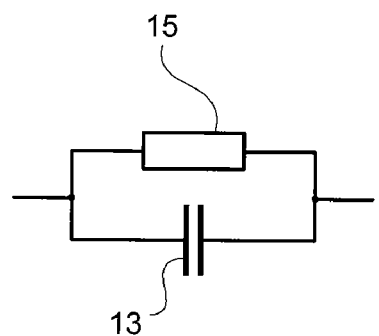
FIG. 3 illustrates an exemplary coupling impedance incorporated in a first transceiver.

The first coupling impedance 2 has a high pass characteristic and the second coupling impedance 8 has a low pass characteristic. In one variant of the invention, the circuit according to FIG. 3 is used as first coupling impedance 2. This circuit is a parallel combination of a capacitor 13 and a resistor 15. For low frequencies, the magnitude of the coupling impedance 2 is substantially equal to (or optionally equal to) the value of the resistor 15. For higher frequencies, the magnitude is reduced by the capacitor whose magnitude with increasing frequencies decreases. This circuit is especially advantageous if the characteristic impedance 6 can be well approximated by a pure resistance.

Figure 4:
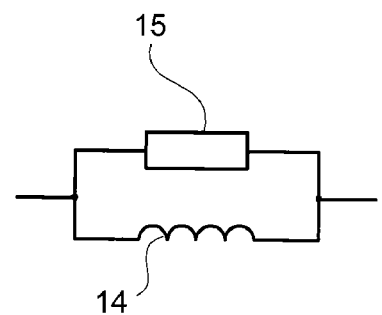
FIG. 4 illustrates an exemplary coupling impedance incorporated in a second transceiver.

By way of further example, the circuit depicted in FIG. 4 is used for the second coupling impedance 8. The circuit is a parallel combination of a resistor 15 and an inductor 14. The magnitude of this circuit for lower frequencies is decisively influenced by the inductor and decreases with falling frequencies. For the frequency zero, this circuit has the magnitude zero. For high frequencies the magnitude is substantially equal to (or optionally equal to) the resistance of the resistor 15.

Figure 5:
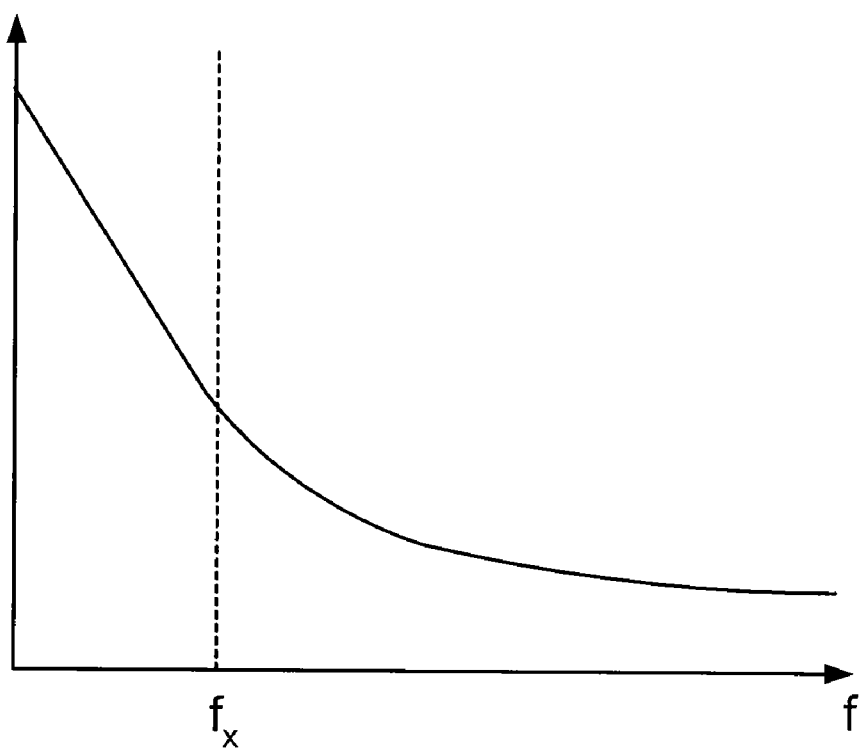
FIG. 5 illustrates a diagram showing the frequency response of the coupling impedance of FIG. 3.

In FIG. 5, the frequency response of the magnitude of the first coupling impedance 2 is depicted. It can be seen that the magnitude with increasing frequencies is decreasing. For frequencies higher than the threshold frequency $f_x$ the magnitude is substantially lower than for frequencies lower than the threshold frequency $f_x$. Since the transmitting frequency range 11 of the first transceiver 1 is above the threshold frequency 11 and the receiving frequency range 12 is below the threshold frequency $f_x$ the transmit signal power requirement can be reduced and simultaneously the power of the received signal is high.

Figure 6:
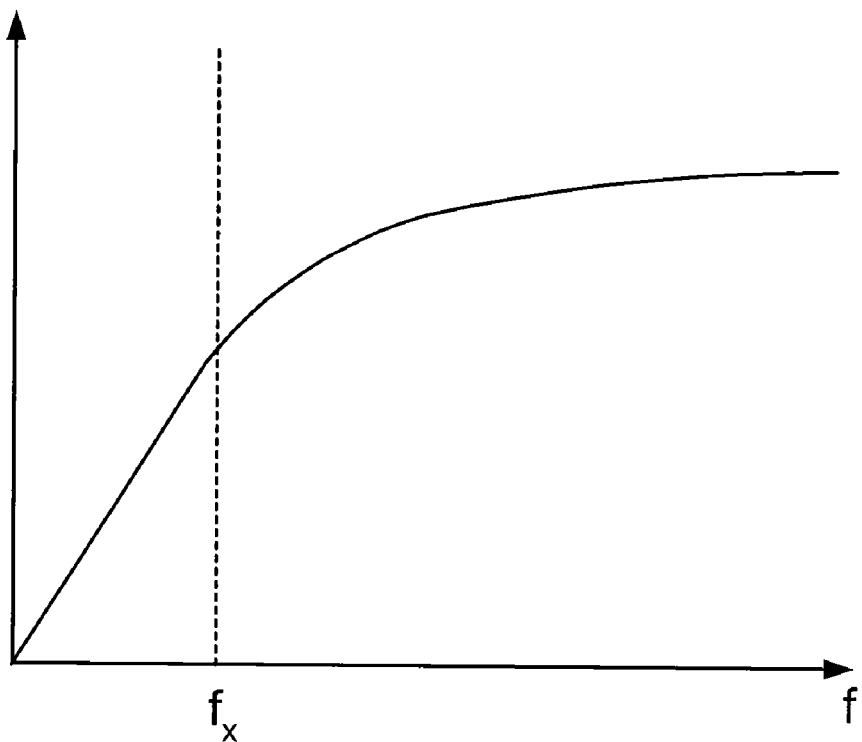
FIG. 6 illustrates a diagram showing the frequency response of the coupling impedance of FIG. 4.

The same applies, by way of further example, for the second coupling impedance 8 whose frequency response of the magnitude is depicted in FIG. 6. Contrary to the magnitude of first coupling impedance 2 in the case of the second coupling impedance 8 the magnitude rises with increasing frequencies so that the advantages described above are achieved since for the second transceiver 7 the receiving frequency range 11 is above the transmitting frequency range 12.

By now properly selecting the value for the resistors 15 as a function of the transmission line impedance 6 for the respective receiving frequency ranges 11, 12, one obtains a reasonable approximation of an ideal or desired brickwall impedance so that the signal power of the received signals are increased.

The invention contemplates a circuit topology for full duplex frequency division multiplex transmission systems that mimics brickwall termination impedances.

As described above, the invention provides a transceiver (1) for bidirectional frequency division multiplexed transmission. The transceiver (1) comprises transmission means (3) for transmitting data in a transmission frequency range (11); receiving means (4) for receiving data in a receiving frequency range (12); and, a coupling impedance (2) for connecting the transmission means (3) and the receiving means (4) to a transmission medium (5). The magnitude of the coupling impedance (2) in the transmission frequency range (11) is smaller than (or optionally very much smaller than) the magnitude of the coupling impedance (2) in the receiving frequency range (12). In one variant the transmission means (3) has a voltage source output and the magnitude of the coupling impedance (2) in the transmission frequency range (11) is smaller (or optionally very much smaller than) than the magnitude of the coupling impedance (2) in the receiving frequency range (12). In another variant the transmission means (3) has a current source output and the magnitude of the coupling impedance (2) in the transmission frequency range (11) is higher than the magnitude of the coupling impedance (2) in the receiving frequency range (12). In a further variant, the coupling impedance (2) in the receiving frequency range (12) is substantially identical to the complex conjugate of the transmission line impedance (6) in the receiving frequency range (12). In yet a further variant, the transmission frequency range (11) comprises higher frequencies than the receiving frequency range (12) and the coupling impedance (2) has a high pass filter characteristic. Optionally, the transceiver (1) includes a coupling impedance (2) which is a parallel combination of a capacitor (13) and a resistor (15). In yet a further variant, the transmission frequency range (12) comprises lower frequencies than the receiving frequency range (11) and the coupling impedance (7) has a low pass filter characteristic. Optionally, the coupling impedance (7) is a parallel combination of an inductor (14) and a resistor (15).

In yet a further variant of the transceiver (1), the transmission frequency range (11) and the receiving frequency range (12) are separated by a threshold frequency (fx).

It is appreciated that the transceiver having the features described above is part of a communication system for a digital subscriber line. The communication system has two (or more) transceivers (1, 7) described above. By way of example, the transmitting frequency range (11) of a first transceiver (1) corresponding the receiving frequency range of a second transceiver (7) is above a threshold frequency (fx) and the receiving frequency range (12) of the first transceiver (1) corresponding the transmitting frequency range of the second transceiver (7) is below the threshold frequency (fx). The first coupling impedance (2) of the first transceiver (1) has high pass filter characteristic and a second coupling impedance (8) of the second transceiver (7) has low pass filter characteristic.

Many alterations and modifications may be made by those having ordinary skill in the art without departing from the spirit and scope of the invention. Therefore, it must be understood that the illustrated embodiments have been set forth only for the purposes of example, and that it should not be taken as limiting the invention as defined by the following claims. The following claims are, therefore, to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent, and also what incorporates the essential idea of the invention.

I claim:

1. A frequency division multiplexing transceiver coupled to a transmission medium, the frequency division multiplexing transceiver comprising:
   a receiver coupled to the transmission medium for receiving data within a first frequency range; and
   a transmitter coupled to the transmission medium for transmitting data within a second frequency range, the transmitter coupled to the transmission medium through a coupling impedance;
   wherein the coupling impedance acts as a filter to prevent signals within the first frequency range from reaching the transmitter;
   wherein the first frequency range is below a threshold frequency ($f_x$) and the second frequency range is above the threshold frequency ($f_x$).

2. The transceiver of claim 1, wherein the coupling impedance is substantially identical to a complex conjugate of a characteristic impendence of the transmission medium.

3. The transceiver of claim 2, wherein a characteristic impedance of the transmission medium is substantially approximated by a pure resistance.

4. The transceiver of claim 1, wherein the coupling impedance is a parallel combination of a capacitor and a resistor.

5. The transceiver of claim 1, wherein the transceiver is configured to be coupled to a digital subscriber line.

6. A frequency division multiplexing transceiver coupled to a transmission medium, the transmission medium having a characteristic impedance, the frequency division multiplexing transceiver comprising:
   a receiver coupled to the transmission medium for receiving data within a first frequency range; and
   a transmitter coupled to the transmission medium for transmitting data within a second frequency range, the transmitter coupled to the transmission medium through a coupling impedance;
   wherein the coupling impedance acts as a filter to prevent signals within the first frequency range from reaching the transmitter;
   wherein a resistance of the coupling impedance is a function of the characteristic impedance of the transmission medium;
   wherein the first frequency range is below a threshold frequency ($f_x$) and the second frequency range is above the threshold frequency ($f_x$).

7. The transceiver of claim 6, wherein the coupling impedance is a parallel combination of a capacitor and a resistor.

8. The transceiver of claim 6, wherein the transceiver is implemented in a digital subscriber line communications system.

9. A frequency division multiplexing transceiver coupled to a transmission medium, the frequency division multiplexing transceiver comprising:
   a receiver coupled to the transmission medium for receiving data within a first frequency range; and
   a transmitter coupled to the transmission medium for transmitting data within a second frequency range, the transmitter coupled to the transmission medium through a coupling impedance;
   wherein the coupling impedance acts as a filter to prevent signals within the first frequency range from reaching the transmitter;
   wherein the first frequency range is above a threshold frequency ($f_x$) and the second frequency range is below the threshold frequency ($f_x$).

10. The transceiver of claim 9, wherein the coupling impedance is substantially identical to a complex conjugate of a characteristic impendence of the transmission medium.

11. The transceiver of claim 10, wherein a characteristic impedance of the transmission medium is substantially approximated by a pure resistance.

12. The transceiver of claim 9, wherein the coupling impedance is a parallel combination of an inductor and a resistor.

13. The transceiver of claim 9, wherein the transceiver is configured to be coupled to a digital subscriber line.

14. A frequency division multiplexing transceiver coupled to a transmission medium, the transmission medium having a characteristic impedance, the frequency division multiplexing transceiver comprising:
   a receiver coupled to the transmission medium for receiving data within a first frequency range; and
   a transmitter coupled to the transmission medium for transmitting data within a second frequency range, the transmitter coupled to the transmission medium through a coupling impedance;
   wherein the coupling impedance acts as a filter to prevent signals within the first frequency range from reaching the transmitter;
   wherein a resistance of the coupling impedance is a function of the characteristic impedance of the transmission medium;
   wherein the first frequency range is above a threshold frequency ($f_x$) and the second frequency range is below the threshold frequency ($f_x$).

15. The transceiver of claim 14, wherein the coupling impedance is a parallel combination of an inductor and a resistor.

16. The transceiver of claim 14, wherein the transceiver is implemented in a digital subscriber line communications system.

* * * * *

UNITED STATES PATENT AND TRADEMARK OFFICE
CERTIFICATE OF CORRECTION

PATENT NO. : 7,450,715 B2 Page 1 of 1
APPLICATION NO. : 11/857255
DATED : November 11, 2008
INVENTOR(S) : Rudi Verbist It is certified that error appears in the above-identified patent and that said Letters Patent is hereby corrected as shown below:

Title Page, Item (*), Notice, please add "This patent is subject to a Terminal Disclaimer,".

Signed and Sealed this

Third Day of February, 2009

JOHN DOLL
*Acting Director of the United States Patent and Trademark Office*